United States Patent [19]

DiMeo

[11] Patent Number: 4,693,505
[45] Date of Patent: Sep. 15, 1987

[54] ROBOT GRIPPER

[75] Inventor: Frank N. DiMeo, Drexel Hill, Pa.

[73] Assignee: Litton Systems, Inc., Clifton Heights, Pa.

[21] Appl. No.: 851,468

[22] Filed: Apr. 14, 1986

[51] Int. Cl.$^4$ ............................................. B25J 15/02
[52] U.S. Cl. .................................. 294/119.1; 294/86.4
[58] Field of Search ................. 294/119.1, 87.26, 86.4, 294/106, 86.62, 67.22, 81.2, 67.33, 93, 115, 81.54; 414/4, 729, 730, 735, 738, 739, 751

[56] References Cited

U.S. PATENT DOCUMENTS

| 3,002,779 | 10/1961 | Frate et al. | 294/119.1 |
| 4,178,119 | 12/1979 | Busch | 294/86.4 |
| 4,544,193 | 10/1985 | Dunn et al. | 294/119.1 |

Primary Examiner—James B. Marbert
Attorney, Agent, or Firm—Brian L. Ribando

[57] ABSTRACT

A gripper mechanism has opposed parallel fingers which open and close while remaining parallel to one another. The gripper mechanism is driven by a reversing electric motor which rotates a drive screw. A pair of arms support the fingers and are driven by the engagement of a pair of angled drive slots with a roller which travels along the length of the drive screw. The pair of arms are supported and guided by three parallel shafts which are arranged in a triangular configuration. A resilient drive coupling between the motor and the drive screw prevents the threads of the drive screw from locking with the roller mechanism.

7 Claims, 4 Drawing Figures

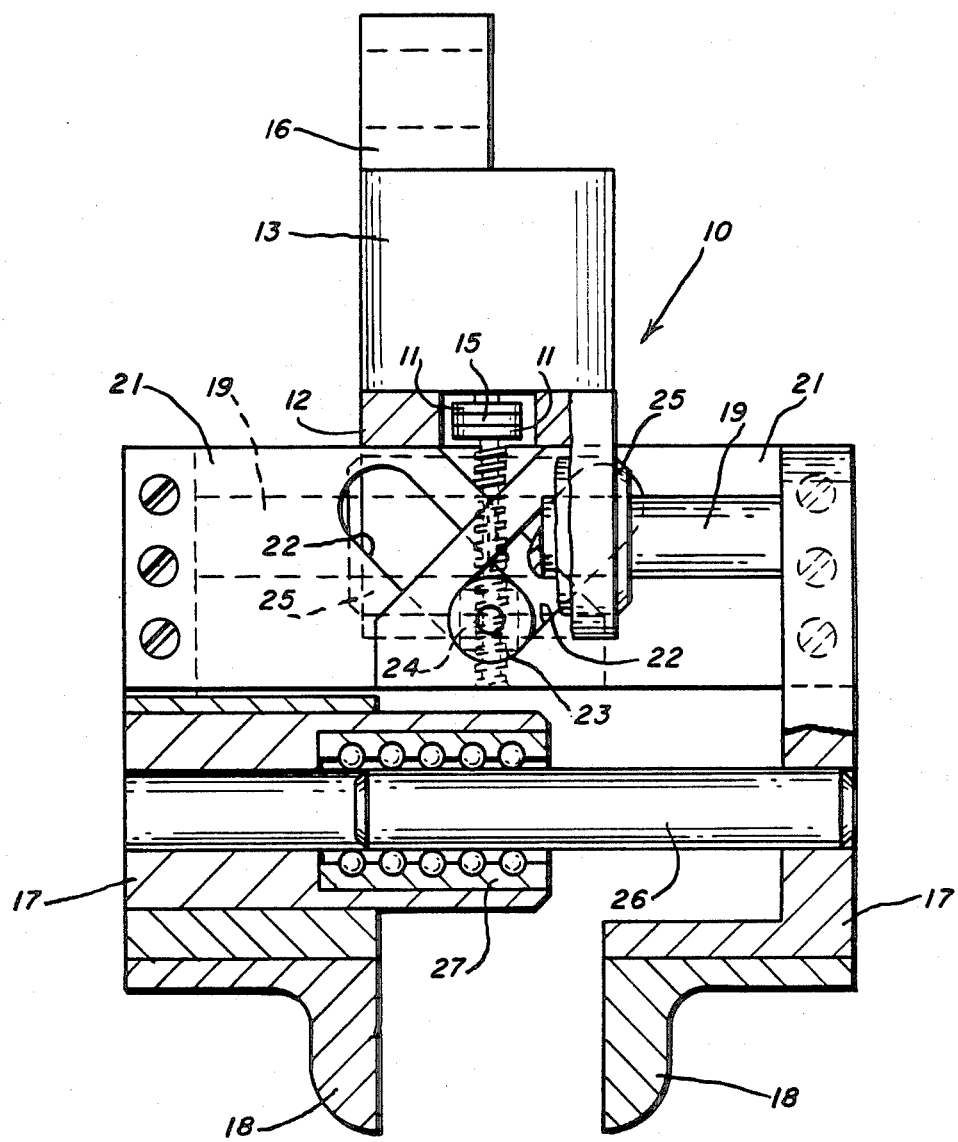
Fig_1

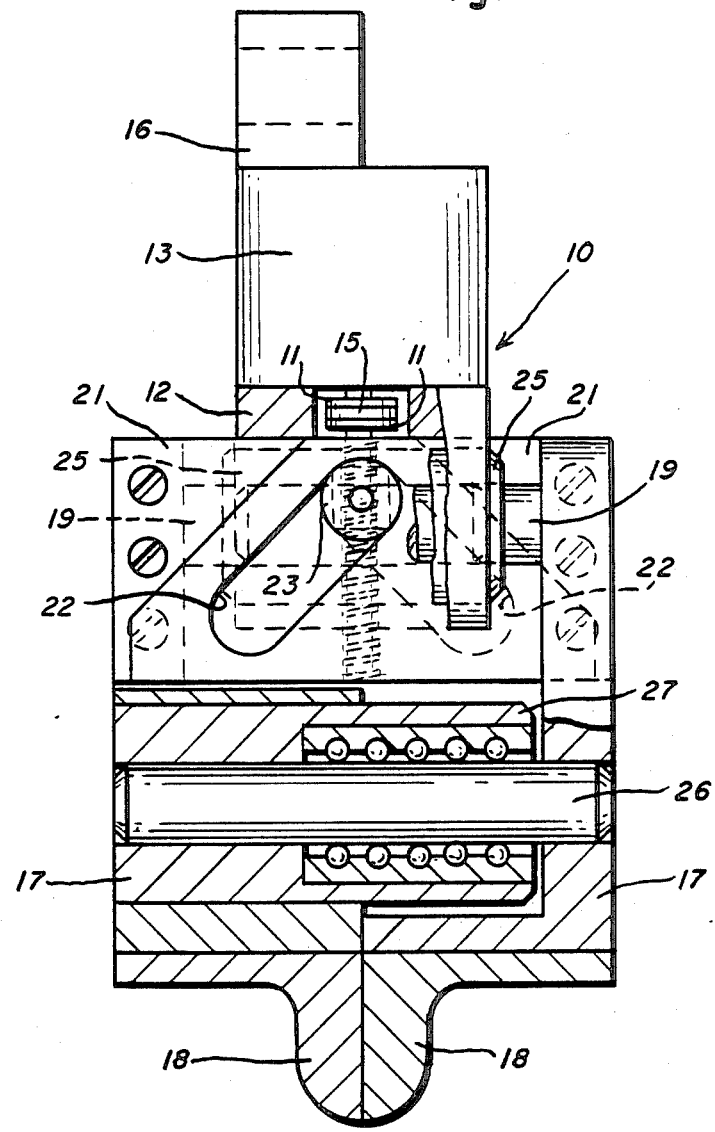
Fig_2

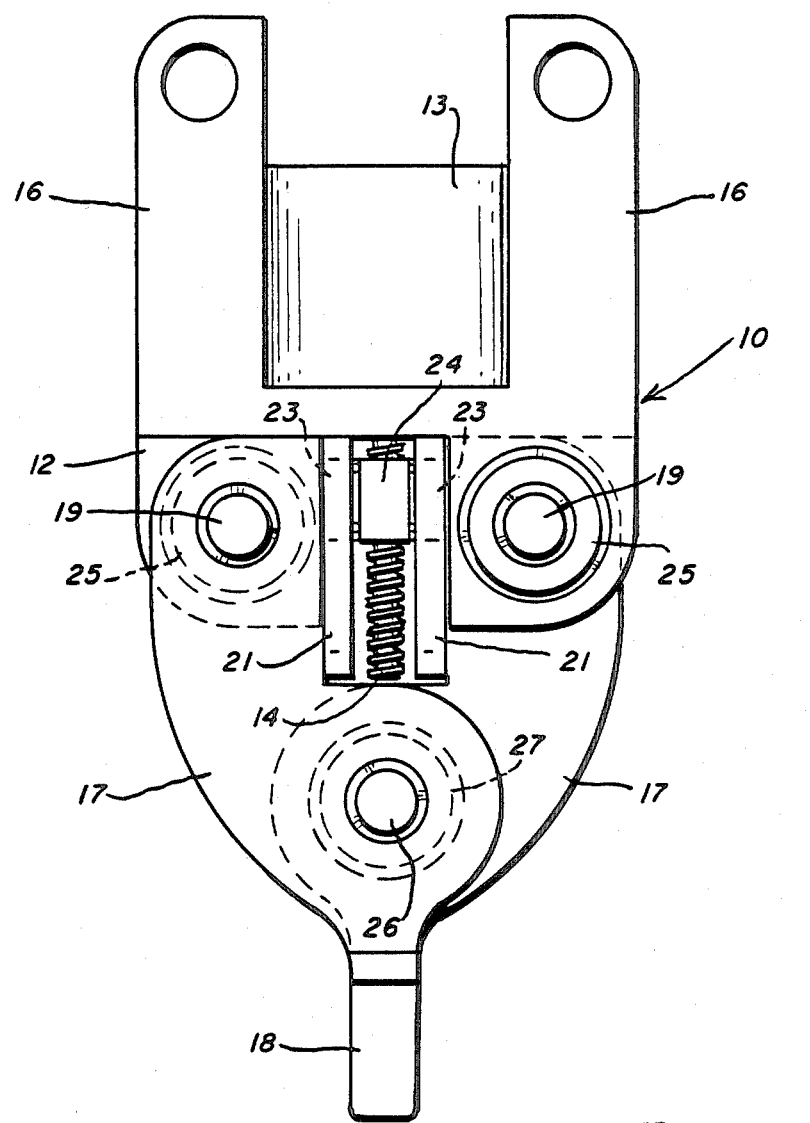
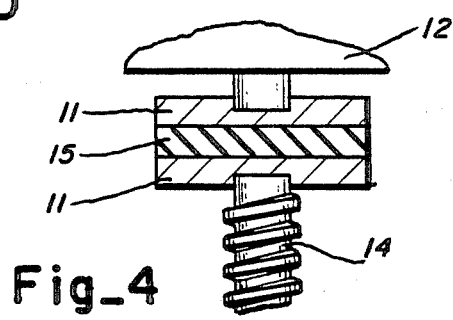

4,693,505

ROBOT GRIPPER

BACKGROUND OF THE INVENTION

This invention relates to a gripper mechanism with opposed parallel fingers which open and close while remaining parallel to one another.

Gripper mechanisms are well known in the art. Such mechanisms normally comprise a pair of fingers which are driven by a set of gears or hydraulic actuators to open and close relative to one another. Gear mechanisms are expensive to manufacture and thus add undesirable costs to the gripper mechanism. Hydraulic mechanisms require a source of driving fluid and are prone to leakage. Thus, such hydraulic mechanisms result in a gripper which is complicated and prone to malfunction.

It would therefore be desirable to provide a gripper mechanism which avoids the drawbacks of the prior art.

SUMMARY AND OBJECTS OF THE INVENTION

According to the invention, a gripper mechanism is powered by a reversing electric motor which turns a drive screw. The drive screw has helical threads formed thereon which engages a threaded stub and a roller mechanism. Rotation of the drive screw causes a linear motion of the roller mechanism which engages a pair of angled drive slots attached to a pair of gripper arms. The tendency for the drive screw to lock against the threaded stub is prevented by a resilient coupling element which couples the shaft of the motor to the drive screw. The arms of the gripper mechanism are supported and guided by a 3-point support system arranged in a triangular configuration. The support system provides rigid and precise location for the pair of arms and allows the gripper fingers to open and close while remaining parallel to one another.

It is thus an object of the invention to provide a gripper mechanism having opposed parallel fingers which open and close while remaining parallel to one another.

It is another object of the invention to provide a gripper mechanism which is driven by a reversing motor acting through a drive screw and a pair of angled drive slots.

It is another object of the invention to provide a gripper mechanism having a motor driven screw in which a resilient coupling between the motor and the screw prevents a locking of the screw threads with the driven mechanism.

It is a further object of the invention to provide a gripper mechanism having 3-point support and guidance for a pair of gripper arms.

These and other objects of the invention will become apparent by the following detailed description in which reference numerals used throughout the description correspond to elements shown on the drawing figures.

BRIEF DESCRIPTION OF THE DRAWINGS

FIG. 1 shows a gripper mechanism according to the invention in the open position.

FIG. 2 shows the gripper mechanism of FIG. 1 in the closed position.

FIG. 3 is a side view of the gripper mechanism of FIGS. 1 and 2.

FIG. 4 shows resilient coupling used in the gripper mechanism of the invention.

DESCRIPTION OF THE PREFERRED EMBODIMENT

Referring now to FIGS. 1 and 2, there is shown a gripper mechanism generally indicated by the reference numeral 10. The gripper mechanism includes a body. 12 which supports a motor 13. The motor is an electromechanical rotary motor which may be selectively energized to rotate in either direction. A coupling best seen in FIG. 4 joins the motor shaft to a drive screw 14 having a helical drive path formed thereon. The coupling comprises a pair of metal plates 11 each of which are cemented to an interposed rubber disc 15. A pair of mounting brackets 16 are coupled to the body 12 and are used to mount the gripper mechanism 10 to a suitable support surface (not shown). The gripper mechanism further comprises a pair of rigid arms 17. Each arm 17 has a finger 18 rigidly attached thereto. The fingers 18 are mounted on the arms 17 so as to be opposed to one another as shown.

The arms 17 are mounted to the body 12 and are guided in their movement relative to one another by a 3-point support and guide system. With reference to FIG. 3, two support shafts 19 and a guide pin 26 are positioned in a triangular configuration to provide rigid support for the arms 17. A support shaft 19 is mounted on each arm and extends toward the body 12, and two linear bearings 25 are mounted in the body 12 to slidably receive the support shafts 19. A third linear bearing 27 is mounted in the lower end of one of the arms 17 and receives the end of a guide pin 26 which is mounted on the other arm 17.

A plate 21 forms an extension of the upper end of each of the arms 17 remote from the fingers 18. The two plates 21 extend toward one another and overlap on either side of the drive screw 14. Each plate 21 has an angled drive slot 22 formed therein. The drive slots 22 are angled with respect to one another and overlap in the region of the drive screw 14. The drive screw 14 bisects the angle formed between the two drive slots 22. A double roller element 23 is mounted on the drive screw 14 by means of a threaded stub 24 which engages the helical threads of the drive screw. The double roller element 23 engages each of the drive slots 22 formed in the two plates 21.

MODE OF OPERATION OF THE PREFERRED EMBODIMENT

In order to operate the gripper mechanism, suitable electrical signals are provided to the drive motor in a manner which is well known in the art. In practice, the drive motor 13 may comprise a stepper motor or a brush-type or brushless DC motor. When the motor is driven in a clockwise or a counterclockwise direction, the drive screw 14 is rotated by the plates 11 and the rubber disc 15 which comprise the coupling. As the drive screw 14 rotates relative to the stub 24, the engagement of the stub 24 with the helical drive path on the drive screw 14 causes the stub 24 and the roller element 23 to travel along the length of the screw.

In past designs, it was found that gripping an object with the gripper fingers 18 caused the helical threads of the drive screw 14 to lock with the threaded stub 24. The locking force between the threads (caused by a physical distortion of the threads) can be greater than the force which can be developed by the motor to release the fingers; and as a result, the gripper mechanism would jam. The resilient disc 15 in the coupling between the motor shaft and the drive screw 14 prevents such jamming. When the fingers 18 are forced against an object, torque on drive screw 14 causes the resilient disc 15 to "wind-up". When the motor is reversed to release the object, the "wind-up" of the resilient disc is released which allows any locking of the threads of the drive screw 14 against the stub 24 to release.

Engagement of the roller element 23 with the angled drive slots 22 in the plates 21 translates motion of the roller element 23 along the drive screw 14 into lateral motion of the plates 21. The lateral motion of the plates 21 causes the arms 17 to slide back and forth on the support shafts 19. The lower end of the arms 17 are guided in their motion by the guide pin 26 which is journaled in the slide bearing 27. Through suitable energization, the fingers 18 may be driven to the open position as shown in FIG. 1 or to the closed position as shown in FIG. 2. Moreover, the parallel arrangement of the support shafts 19 and the guide pin 26 causes the opposed fingers 18 to remain parallel to one another throughout the range of motion of the fingers 18. The drive signals to the motor may be stopped as desired in order to position the fingers at any location between the fully opened and fully closed positions.

Having thus described the invention, various alterations and modifications thereof will occurred to those skilled in the art, which alterations and modifications are intended to be within the scope of the present invention as defined by the appended claims.

What is claimed is:

1. A gripper mechanism having opposed parallel fingers which open and close while remaining parallel to one another, the gripper mechanism comprising:
    a body member;
    a bidirectional rotary motor mounted on the body member;
    a drive screw coupled to said rotary motor for rotation therewith;
    a pair of arms rigidly supporting a pair of opposed parallel fingers; and
    engagement means between the drive screw and the pair of arms, the engagement means comprising:
    (a) a pair of plates rigidly mounted one each on the pair of arms;
    (b) a pair of straight elongated inclined drive slots formed on each in the pair of plates, wherein one of the drive slots has an inclination relative to the drive screw which is opposite to the inclination of the other drive slot relative to the drive screw;
    (c) a roller element engaging each of the drive slots and coupled to the drive screw, whereby rotation of the drive screw causes the roller element to be displaced along the length of the drive screw, and the engagement of the roller element with the inclined drive slots translates the displacement of the roller element along the drive screw into lateral motion of the plates and the pair of arms and fingers, whereby rotation of the screw in one direction causes the arms and the fingers to open, and rotation of the screw in the opposite direction causes the arms and fingers to close.

2. The gripper mechanism of claim 1 further comprising:
    a resilient coupling between the motor and the drive screw.

3. The gripper mechanism of claim 2 wherein the resilient coupling comprises:
    a first plate coupled to the motor shaft;
    a second plate coupled to the drive screw; and
    a resilient disc joining the first plate to the second plate.

4. The gripper mechanism of claim 1 further comprising:
    a first angle formed between the two drive slots and a second angle formed between each of the drive slots and the drive screw, whereby the first angle is equal to twice the second angle.

5. The gripper mechanism of claim 4 further comprising:
    a pair of support shafts mounted on each of the pair of arms; and
    a pair of linear bearings mounted on the body member for slidably receiving the support shafts.

6. The gripper mechanism of claim 5 further comprising:
    a guide means mounted on the pair of arms parallel to the support shafts for guiding the position of the pair of fingers during the opening and the closing thereof, the guide means comprising a guide pin mounted on one of said arms and a linear bearing mounted on the other arms, wherein the guide pin slides in said slide bearing.

7. The gripper mechanism of claim 6, wherein the two axes of the support shafts and the axis of the guide pin are positioned on the gripper mechanism in a triangular configuration.

* * * * *